United States Patent Office 3,709,865
Patented Jan. 9, 1973

3,709,865
METHOD OF PREPARING CATIONIC DYEABLE POLYCAPROLACTAM
Robert Alden Lofquist, Richmond, Lamberto Crescentini, Chester, and Robert Charles Wincklhofer, Richmond, Va., assignors to Allied Chemical Corporation, New York, N.Y.
No Drawing. Filed Apr. 1, 1971, Ser. No. 130,441
Int. Cl. C08g 20/12
U.S. Cl. 260—18 N        16 Claims

ABSTRACT OF THE DISCLOSURE

Cationic dyeable polycaprolactam is prepared by adding from 0.5 to 2.0 mole percent of N-sulfobutylhexamethylenediamine or the alkali salt thereof with preferably 0.5 to 2.6 mole percent (on total moles of lactam) of azelaic acid, the excess of diacid over diamine being preferably such that the polyamide has zero to 80 more equivalents of acid over amine, per $10^6$ grams of polymer. Also, less than 30 equivalents of amino end groups are preferred. In the place of azelaic acid may be used an alkali salt of azelaic acid such as lithium hydrogen azelate, or mixtures of disodium azelate with azelaic acid. The dialkyl ester such as dimethyl azelate of azelaic acid can also be used. In place of azelaic acid, or its equivalents as mentioned above, the same number of equivalents of dimer acid, formed by dimerization of oleic acid, can be used. Alkali cation may also be added by adding alkali oxide, hydroxide, carbon or bicarbonate.

SUMMARY OF THE INVENTION

A method of preparing a cationic dyeable polycaprolactam with significantly reduced precipitates has been discovered. The method consists of adding a minor amount, preferably about 0.5 to 2.0 mole percent of N-sulfobutyl-hexamethylenediamine or its alkali salt, and an amount, preferably about 0.5 to 2.6 mole percent of a compound selected from the group consisting of azelaic acid, alkali salts of azelaic acid, such as disodium azelate or lithium hydrogen azelate, dialkyl esters of azelaic acid, such as dimethyl azelate, the dimer acid of oleic acid, and mixtures thereof.

There must be at least one equivalent, preferably about 1 to 1.1 equivalents of alkali per equivalent of sulfur present as the sulfonate. This equivalent of alkali can be either as the alkali salt of the diamine or the diacid, or as alkali oxide, hydroxide, carbonate, or bicarbonate. The alkali cation is a metal from Group I of Periodic Table of Elements. Only an amount of cation sufficient to neutralize the sulfonic acid moiety is necessary. Preferably there is excess of diacid over diamine in the polycaprolactam of about 0.1 to 80 equivalents per $10^6$ grams of polymer of acid over amine. Conventional polymerization initiating agents such as water or ω-aminocaproic acid may also be present during polymerization. Also, conventional antioxidants may be added.

The preferred polycaprolactam has less than 30, and more preferably about 8 to 30 equivalents of amino end group per $10^6$ grams of polycaprolactam.

DESCRIPTION OF THE PREFERRED EMBODIMENTS

EXAMPLES 1 THROUGH 7

(Lactam was heated to 90° C. and the other materials added)

| | Lactam, grams | N-sulfo-butylhexa-methylene-diamine, grams | Water, cc. | NaHCO₃, grams | Dibasic acid | Solution |
|---|---|---|---|---|---|---|
| 1 | 160 | 3.63 | 10 | 1.2 | Sebacic, 3.63 gm | No. |
| 2 | 160 | 3.63 | 10 | 1.2 | Azelaic, 3.36 gm | Yes. |
| 3 | 160 | 3.63 | 10 | 1.2 | Adipic, 2.62 gm | No. |
| 4 | 160 | 3.63 | 10 | 1.2 | Dodecanoic, 4.11 gm | No. |
| 5 | 160 | 3.63 | 10 | 1.2 | Dimer acid [1] Emery Empol ® 1010, 10.1 gm | Yes. |
| 6 | 160 | 3.63 | 10 | 1.2 | Isophthalic, 2.97 gm | No. |
| 7 | 160 | 3.63 | 10 | 1.2 | Succinic, 2.27 gm | No. |

[1] Dimer acid is produced by dimerization of $C_{18}$ fatty acids to a high molecular weight, long aliphatic chain, polycarboxylic structure. Empol ® 101 is a pure grade of commercially available dimer acid, containing 97% dimer, 3% trimer, no monobasic acids, and extremely low unsaturation.

BACKGROUND OF THE INVENTION

This invention relates to a method of preparing a cationic dyeable polycaprolactam and shaping it into filaments, fibers and films.

Prior art includes E. E. Magat, U.S.P. 3,184,436 and Bodesheim et al., U.S.P. 3,454,535.

The patent to Magat discloses the use of 5-sulfoisophthalic acid, to confer basic dyeability to nylon 6,6. In order to have an equal number of carboxyls and amine ends, the hexamethylenediamine salt of 5-sulfoisophthalic acid is added to the hexamethylene diammonium adipate salt. The former salt, and the salts of 5-sulfoisophthalic acid with commercially available diamines are insoluble in caprolactam. The insoluble salt settles out in the polymerization reactors and clogs spinnerette holes during spinning. Bodesheim et al. disclose the use of the salts of N-sulfobutyl-hexamethylenediamine with adipic, sebacic and succinic acid. These salts are also insoluble is caprolactam. The salts of this invention are soluble in lactam and will not precipitate even at the melting point of caprolactam.

EXAMPLES 8 THROUGH 15

(Lactam was heated to 90° C. and the other materials added)

| | Lactam, grams | 5-sulfoisoph-thalic acid sodium salt, grams | Diamine | Solution |
|---|---|---|---|---|
| 8 | 160 | 3.87 | Metaxylylenediamine, 1.28 gm | No. |
| 9 | 160 | 3.87 | Hexamethylenediamine, 1.09 gm | No. |
| 10 | 160 | 3.87 | Menthanediamine, 1.62 gm | No. |
| 11 | 160 | 3.87 | 1,4-cyclohexane bis(methyl-amine), 1.33 gm | No. |
| 12 | 160 | 3.87 | 1,10-diaminodecane, 1.62 gm | No. |
| 13 | 160 | 3.87 | 1,12-diaminododecane, 1.88 gm | No. |
| 14 | 160 | 3.87 | Jeffamine 230 [a] (Jefferson Chemical), 2.16 gm | No. |
| 15 | 160 | 3.87 | 2,2,4-trimethylhexamethylene-diamine, 1.49 gm | No. |

[a] A polypropylene oxide with amine ends, having molecular weight of 230.

In all the above examples, the amount of sulfonate is equal to about 100 sulfonic acid equivalents per $10^6$ grams of polymer. The excess of carboxy over amines in the polymer is about 45 equivalents per $10^6$ grams of polymer.

The examples are given to show that a soluble sulfonate salt does not occur frequently.

The following examples show alternate methods of preparing the soluble additive of this invention.

| Example | Lactam, grams | Sulfonate (0.0143 mole) | Water, cc. | Alkali (0.0143 equiv.) | Dibasic acid (0.0179 mole) |
|---|---|---|---|---|---|
| 16 | 160 | 3.63 gm. N-sulfobutylhexamethylenediamine | 10 | 1.2 NaHCO$_3$ | Azelaic acid, 3.36 gm. |
| 17 | 160 | do | 10 | 0.57 gm. NaOH | Do. |
| 18 | 160 | do | 10 | 0.8 gm. KOH | Do. |
| 19 | 160 | do | 10 | 0.76 gm. Na$_2$CO$_3$ | Do. |
| 20 | 160 | do | 10 | 0.76 gm. Na$_2$CO$_3$ | Dimethyl azelate, 3.86 gm. |
| 21 | 160 | do | 10 | 0 | 1.66 sodium azelate plus 2.01 gm. azelaic acid. |
| 22 | 160 | do | 10 | 0 | 1.66 sodium azelate plus 2.31 gm. dimethyl azelate. |
| 23 | 260 | 3.95 gm. N-sulfobutylhexamethylenediamine sodium salt | 10 | 0 | Azelaic acid, 3.36 gm. |
| 24 | 160 | do | 10 | 0 | Dimethyl azelate, 3.86 gm. |

EXAMPLE 25

Ninety-five parts of caprolactam, 5 parts of ω-aminocaproic acid, 1.35 parts of N-sulfobutyl-hexamethylenediamine, 6 parts of water, 1.375 parts of azelaic acid, and 0.45 part of sodium bicarbonate were mixed in an unagitated reactor, and heated from 90° C. to 255° C. in one hour. The solution was then held at 225° C. for eight hours. After the monomer was extracted, the polyamide had a relative formic acid viscosity of 57.1, a carboxyl analysis of 74 equivalents per $10^6$ grams, an amine analysis of 22 equivalents per $10^6$ grams, and a sulfur content of 1961 p.p.m., indicating approximately 61 sulfonic acid equivalents. No insoluble salt could be detected visually. The polymer was spun using a Modern Plastics 1″ extruder with a 24 to 1 $L/D$, at 260° C. at a rate of 6 pounds per hour into yarn of 10 filaments, 150 total denier, through a 2″ sand pack having an effective porosity of 15–20 microns. The pressure drop across the sand pack rose from 3,000 to 3,250 p.s.i. during the spinning of 100 lbs. of product.

The fibers were dyeable with basic dyestuffs to a good shade.

EXAMPLE 26

Example 25 was repeated, but with 1.51 parts of sebasic acid instead of with 1.375 parts of azelaic acid. The polymer from the reactor had a frosty appearance indicating a fine precipitate in the polymer. The polyamide had a relative formic acid viscosity of 53.2, 77 carboxyls per $10^6$ grams, 23.5 amine equivalents per $10^6$ grams, and 1837 p.p.m. of sulfur.

One hundred pounds of the polymer was spun using a Modern Plastics 1″ extruder at 260° C. at a rate of 6 pounds per hour.

The filter pack pressure rose from 2850 pounds to 3380 pounds during the run. An increase in pressure drop of 530 p.s.i., compared to an increase in pressure drop of only 250 p.s.i. for Example 25.

EXAMPLE 27

Ninety-five parts of caprolactam, 5 parts of ω-aminocaproic acid, 2.03 parts of N-sulfobutyl-hexamethylenediamine, 6 parts of water, 1.89 parts of azelaic acid and 0.675 part of sodium bicarbonate were reacted as in Example 25. The polymer after extraction of monomer had a relative formic acid viscosity of 59.3, 74 carboxyl equivalents per $10^6$ grams, 18 amine equivalents per $10^6$ grams, and a sulfur content of 2910 p.p.m., indicating 91 equivalents of sulfonic acid. Pressure drop across the sand pack during the spinning of 100 pounds rose from 3375 pounds to 3608 pounds, an increase of 305 p.s.i.

EXAMPLE 28

Ninety-five parts of caprolactam, 5 parts of aminocaproic acid, 2.42 parts of 5-sulfoisophthalic acid sodium salt, and 0.8 part of metaxylylenediamine were polymerized as in Example 25. The polymer had a frosty appearance. After the monomer was extracted, the polyamide had a relative formic acid viscosity of 53.7, 78.4 carboxyl equivalents, 16.2 amine equivalents and 3312 p.p.m. sulfur, indicating 103 equivalents of sulfonic acid groups per $10^6$ grams of polymer. One hundred pounds of the polymer was spun with the same extruder as Example 25. The pressure across the sand pack rose from 2950 to 3725 p.s.i., an increase of 775 p.s.i.

DISCUSSION

It can be seen from the above examples that only the butyl homolog of N-sulfoalkyl-hexamethylene diamine or its alkali salt is soluble in lactam when reacted with the dibasic acid which surprisingly must be either azelaic or the dimer acid of oleic acid or their equivalent esters and salts. Thus, surprisingly, only one homolog with only a very narrow group of dibasic acids is operable to form a soluble cationic dyeable additive for caprolactam. Since it is soluble, this additive does not precipitate when the reactants are being mixed. Also, precipitates are not formed during polymerization, or during subsequent processing, such as spinning. This can be seen in the comparative Examples, 25–28.

We claim:

1. A method of preparing a cationic dyeable polycaprolactam consisting of dissolving in caprolactam:
   (a) a minor amount of a N-sulfobutyl-hexamethylenediamine and
   (b) a minor amount of a compound selected from the group consisting of azelaic acid, the dimer acid of oleic acid, dailkyl esters of azelaic acid, the dialkyl esters of the dimer acid, and mixtures thereof, and
   (c) sufficient cation of alkali metal to neutralize the sulfonic acid, then
polymerizing said caprolactam solution of (a), (b), and (c) so that a polycaprolactam of reduced precipitate content is produced as evidenced by reduced increase in pressure drop across a spinnerette during spinning of said polycaprolactam.

2. The method of claim 1 wherein (a) and (c) are present as the alkali metal salt of N-sulfo-butyl-hexamethylenediamine.

3. The method of claim 1 wherein (b) and (c) are present as an alkali metal salt of the (b) compound.

4. The method of claim 1 wherein the alkali metal cation is present as the alkali metal oxide, the alkali metal hydroxide, the alkali metal carbonate, or the alkali metal bicarbonate.

5. The method of claim 1 wherein about 0.5 to 2.0 mole percent of compound (a) based on the total moles of the caprolactam is added and from about 0.5 to about 2.6 mole percent of the compound (b) based on the total moles of the polycaprolactam is added.

6. The method of claim 1 wherein the compounds are added so that no more than 30 equivalents per $10^6$ grams of polymer of amino end groups result in the polycaprolactam.

7. The method of claim 6 wherein from about 8 to about 30 equivalents of amino end groups per $10^6$ grams of polycaprolactam results.

8. The method of claim 6 wherein (b) is added so that an excess of diacid over diamine results with the polycaprolactam having about 0.1 to 80 equivalents per $10^6$ grams polymer more of acid than amino end groups.

9. The method of claim 6 wherein the compound (b) is azelaic acid.

10. The method of claim 6 wherein the compound (b) is the dimer acid of oleic acid.

11. The method of claim 6 wherein a minor amount of a polymerization initiator is also present.

12. The method of claim 11 wherein a minor amount of ω-aminocaproic acid and water are also added to the caprolactam.

13. A cationic dyeable polycaprolactam containing as an integral part of the molecular chain a minor amount of a radical of (a) 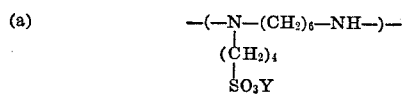

and a minor amount of a radical of (b) 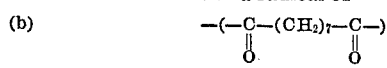

wherein Y is a cation of a metal from Group I of the Periodic Table or H[.], and the amounts added of the compounds containing radicals (a) and (b) result in no more than 30 equivalents per $10^6$ grams of polycaprolactam of amino end groups.

14. The polycaprolactam of claim 13 wherein from about 8 to about 30 equivalents of amino end groups per $10^6$ grams of polycaprolactam result.

15. The polycaprolactam of claim 13 wherein the polycaprolactam is terminated with the compound (b).

16. Polycaprolactam of claim 13 wherein the amount of (b) is such that an excess of diacid results with the polycaprolactam having about 0.1 to 80 equivalents per $10^6$ grams of polymer more of acid than amine.

References Cited

UNITED STATES PATENTS

| | | | |
|---|---|---|---|
| 3,454,535 | 7/1969 | Bodesheim et al. | 260—78 |
| 3,184,436 | 5/1965 | Magat | 260—78 |
| 3,558,567 | 1/1971 | Twilley et al. | 260—78 |
| 3,240,732 | 3/1966 | Ham et al. | 260—78 |
| 3,203,934 | 8/1965 | Wellens et al. | 260—18 |
| 3,389,172 | 6/1968 | Burrows et al. | 260—78 |

DONALD E. CZAJA, Primary Examiner

E. C. RZUCIDLO, Assistant Examiner

U.S. Cl. X.R.

260—78 L